(12) United States Patent
DiPoala

(10) Patent No.: US 11,223,496 B2
(45) Date of Patent: Jan. 11, 2022

(54) SELF-IDENTIFYING, MULTI-FUNCTION SENSOR DEVICE AND MONITORING SYSTEM INCLUDING SAME

(71) Applicants: Bosch Security Systems, Inc., Fairport, NY (US); Robert Bosch GmbH, Stuttgart (DE)

(72) Inventor: William DiPoala, Fairport, NY (US)

(73) Assignee: BOSCH SECURITY SYSTEMS, INC., Fairport, NY (US)

(*) Notice: Subject to any disclaimer, the term of this patent is extended or adjusted under 35 U.S.C. 154(b) by 1125 days.

(21) Appl. No.: 15/136,232

(22) Filed: Apr. 22, 2016

(65) Prior Publication Data

US 2016/0323118 A1 Nov. 3, 2016

Related U.S. Application Data

(60) Provisional application No. 62/155,571, filed on May 1, 2015.

(51) Int. Cl.
| | | |
|---|---|---|
| *H04L 12/28* | (2006.01) | |
| *G08B 13/22* | (2006.01) | |
| *G08B 21/20* | (2006.01) | |
| *G08B 21/14* | (2006.01) | |
| *G08B 25/08* | (2006.01) | |
| *G08B 17/10* | (2006.01) | |

(52) U.S. Cl.
CPC .......... *H04L 12/2827* (2013.01); *G08B 13/22* (2013.01); *G08B 17/10* (2013.01); *G08B 21/14* (2013.01); *G08B 21/20* (2013.01); *G08B 25/08* (2013.01)

(58) Field of Classification Search
None
See application file for complete search history.

(56) References Cited

U.S. PATENT DOCUMENTS

| 6,122,678 A | 9/2000 | Eckel et al. | |
|---|---|---|---|
| 7,218,226 B2* | 5/2007 | Wehrenberg | G08B 13/1409 340/539.1 |
| 8,143,567 B2* | 3/2012 | Williams | G01J 1/04 250/214 AL |
| 8,346,302 B2 | 1/2013 | Alameh et al. | |

(Continued)

OTHER PUBLICATIONS

Apple Inc., iPhone 6s, Technical Specifications, Sep. 19, 2014, p. 1-13.*

*Primary Examiner* — Travis R Hunnings
(74) *Attorney, Agent, or Firm* — Kelly McGlashen; Maginot, Moore & Beck LLC

(57) ABSTRACT

A home security and automation system includes multi-sensor sensor devices that communicate with a base unit. Each sensor device is a self-identifying multi-function device that includes a housing, multiple sensors disposed in the housing, and a communication device disposed in the housing that permits communication between the sensor device and the base unit. Each sensor device is configured to be operated in multiple operating modes, and an active operating mode of each sensor device, corresponding to one operating mode selected from the several possible operating modes, is determined by the orientation in space of the sensor device housing. The base unit is configured to receive from each sensor device information identifying the active operating mode.

20 Claims, 8 Drawing Sheets

(56) References Cited

U.S. PATENT DOCUMENTS

| | | | |
|---|---|---|---|
| 8,717,185 B2* | 5/2014 | Franceschini | H01M 2/1022 340/540 |
| 8,955,022 B2* | 2/2015 | Poder | G08B 25/008 340/500 |
| 2005/0265422 A1 | 12/2005 | Bonne | |
| 2010/0131749 A1 | 5/2010 | Kim et al. | |
| 2014/0333431 A1* | 11/2014 | Abdelsamie | H04M 1/0283 340/539.11 |
| 2014/0343736 A1* | 11/2014 | Meyer | G05D 7/0635 700/283 |
| 2015/0194040 A1* | 7/2015 | Fiedler | G08B 21/182 340/870.09 |
| 2015/0228139 A1* | 8/2015 | Geerlings | G08C 17/02 340/5.61 |

* cited by examiner

SELF-IDENTIFYING, MULTI-FUNCTION SENSOR DEVICE AND MONITORING SYSTEM INCLUDING SAME

CROSS-REFERENCE TO RELATED APPLICATIONS

This application claims the benefit of U.S. Provisional Patent Application No. 62/155,571, filed on May 1, 2015 and entitled "Self-Identifying, Multi-function Sensor Device and Monitoring System Including Same," the entire contents of which are incorporated herein by reference.

FIELD

A system for managing home automation and/or home security includes a control panel and multi-function sensor devices that communicate with the control panel.

BACKGROUND

Home security systems are used to monitor and control security locks of gates, doors and windows, as well as to monitor the interior of the home. Home automation systems are becoming increasingly common, and may be used in combination with a home security system. Home automation systems allow centralized monitoring and control of the home environment, including lighting, heating, ventilation, air conditioning, appliances and entertainment devices. In some cases, home automation systems can provide increased quality of life for persons who might otherwise require caregivers or institutional care, including the elderly and disabled. Home security and automation systems provide security, improved convenience, comfort and energy efficiency.

Home security and automation systems may include one or more dedicated sensors that monitor one specific aspect of the home environment. For example, a temperature sensor may be installed near a gas grill to let a homeowner know when the gas grill has been left on. In another example, a motion detector may be used to alert the homeowner to movement in the vicinity of a door. However, overhead costs, including the cost to design, manufacture, stock, distribute and sell a particular dedicated sensor, may be prohibitive. In addition, integration of individual dedicated sensors into a home security and/or automation system can be technically challenging for some consumers.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In some aspects, a sensor device includes a housing, and an attribute sensor associated with the housing, the attribute sensor configured to detect an orientation of the housing. The sensor device includes functional sensors associated with the housing, the functional sensors configured to provide multiple possible sensor device operating modes. In addition, the sensor device includes a communication device associated with the housing, the communication device configured to communicate output from at least one of the attribute sensor and the functional sensors to a remote controller. The sensor device is configured to be operated in an active operating mode corresponding to one operating mode selected from the multiple possible sensor device operating modes, and the active operating mode is determined by the orientation of the housing.

The sensor device may include one or more of the following features: The housing is multi-sided and a unique functional sensor is associated with each side of the housing. The functional sensors are configurable for use individually and in combination to provide the multiple possible sensor device operating modes. A first sensor function is associated with a first orientation of the housing, and a second sensor function is associated with a second orientation of the housing, where the second orientation is different than the first orientation. A combination of functional sensors is associated with the first orientation of the housing. The housing has an outer surface that includes a first region and a second region that is spaced apart from the first region, and the first region and the second region are configured to permit the housing to be supported in a predetermined orientation. The housing is a polyhedron and the first region corresponds to a first side of the polyhedron, and the second region corresponds to a second side of the polyhedron. The first region is marked with a first indicia that represents one operating mode of the multiple possible sensor device operating modes, and the second region is marked with a second indicia that represents another operating mode of the multiple possible sensor device operating modes. In addition, the active operating mode of the sensor device is selected by placing the housing on a support surface such that one of said regions rests on the support surface, and another of said regions corresponding to a desired operating mode is set parallel to the support surface and is visible to the user. The attribute sensor is an accelerometer. The attribute sensor is configured to detect an orientation of the housing with respect to one of space and a support surface. The functional sensors are selected from the group comprising a proximity sensor, a visible light sensor, a temperature sensor, a water sensor, a motion sensor, a contact sensor, a humidity sensor, a gyroscope, and a gas detector. The sensor device includes a microcontroller that is configured to determine at least one of an orientation of the housing and a sensor function of the sensor device. At least one of an orientation of the housing and a sensor function of the sensor device is determined by a remote system controller based on a signal emitted by the sensor device.

In some aspects, a security system includes a base unit including a controller and a transceiver, and a sensor device. The sensor device includes a housing, multiple sensors associated with the housing, and a communication device associated with the housing that permits communication with the base unit. The sensor device is operable in multiple operating modes, and an active operating mode of the sensor device, corresponding to one operating mode selected from the several possible operating modes, is determined by the orientation in space of the sensor device housing. In addition, the base unit is configured to receive from the sensor device information corresponding to the active operating mode.

The security system includes one or more of the following features: Information corresponding to the active operating mode includes at least one of sensor device orientation, sensor device function, and sensor output. The base unit is configured to configure the security system to operate based on the active operating modes of the sensor device. The sensor device includes a unique identification number, and is configured to communicate the active operating mode and the unique identification number to the base unit. The controller is configured to receive an output signal from the sensor device and perform a notification function corresponding to the output signal. The sensor device comprises a first sensor device having a first plurality of sensors, and a second sensor device having a second plurality of sensors that are different from the first plurality of sensors.

In some aspects, a security system includes a base unit including a controller and a first communication device, and a sensor device. The sensor device includes a housing, multiple sensors associated with the housing, and a second communication device associated with the housing that permits communication with the first communication device. The sensor device is configured to be operated in a predetermined operating mode, and a location of the sensor device within a region being secured by the security system is determined by the orientation in space of the sensor device housing. In addition, the base unit is configured to receive from the sensor device information identifying the location of the sensor device within a region being secured by the security system, and to configure the security system to operate based on the predetermined operating mode of the sensor device.

In some aspects, a self-identifying sensor device includes sensors of different kinds that are incorporated within a single housing, thus providing a multi-function sensor device. By including multi-function capability within a single sensor device, manufacturing and overhead costs may be reduced. In addition, the sensor device provides increased system configuration options and functionality for the system user as compared to a dedicated function sensor.

In some aspects, a home security and automation system includes at least one, and preferably several, sensor devices to monitor and control home security and the home environment. Although the sensor device includes multiple sensors whereby it is capable of performing multiple different sensor functions, in use the sensor device performs a single sensor function which is determined by the orientation of the sensor device housing in space.

In some aspects, the sensor device detects its orientation in space and/or with respect to a support surface and transmits that information to a remote system controller, which then monitors and controls the sensor device in accordance with the sensor function corresponding to its spatial orientation. This self-identification feature of the sensor device advantageously provides a home security and automation system that is very easy to install, set up and use. It also provides a home security and automation system that is easily modified, since any sensor devices newly added to the system are self-identifying and the system can automatically and seamlessly adapt to the presence of the new sensor devices.

In some aspects, the sensor device detects its orientation in space and/or with respect to a support surface and, based on the detected orientation, activates one or more sensors within the sensor device in accordance with the sensor function corresponding to its spatial orientation. The communication device transmits information from the activated sensors to a remote system controller.

The details of one or more features, aspects, implementations, and advantages of this disclosure are set forth in the accompanying drawings, the detailed description, and the claims below.

DETAILED DESCRIPTION

Figure 1:
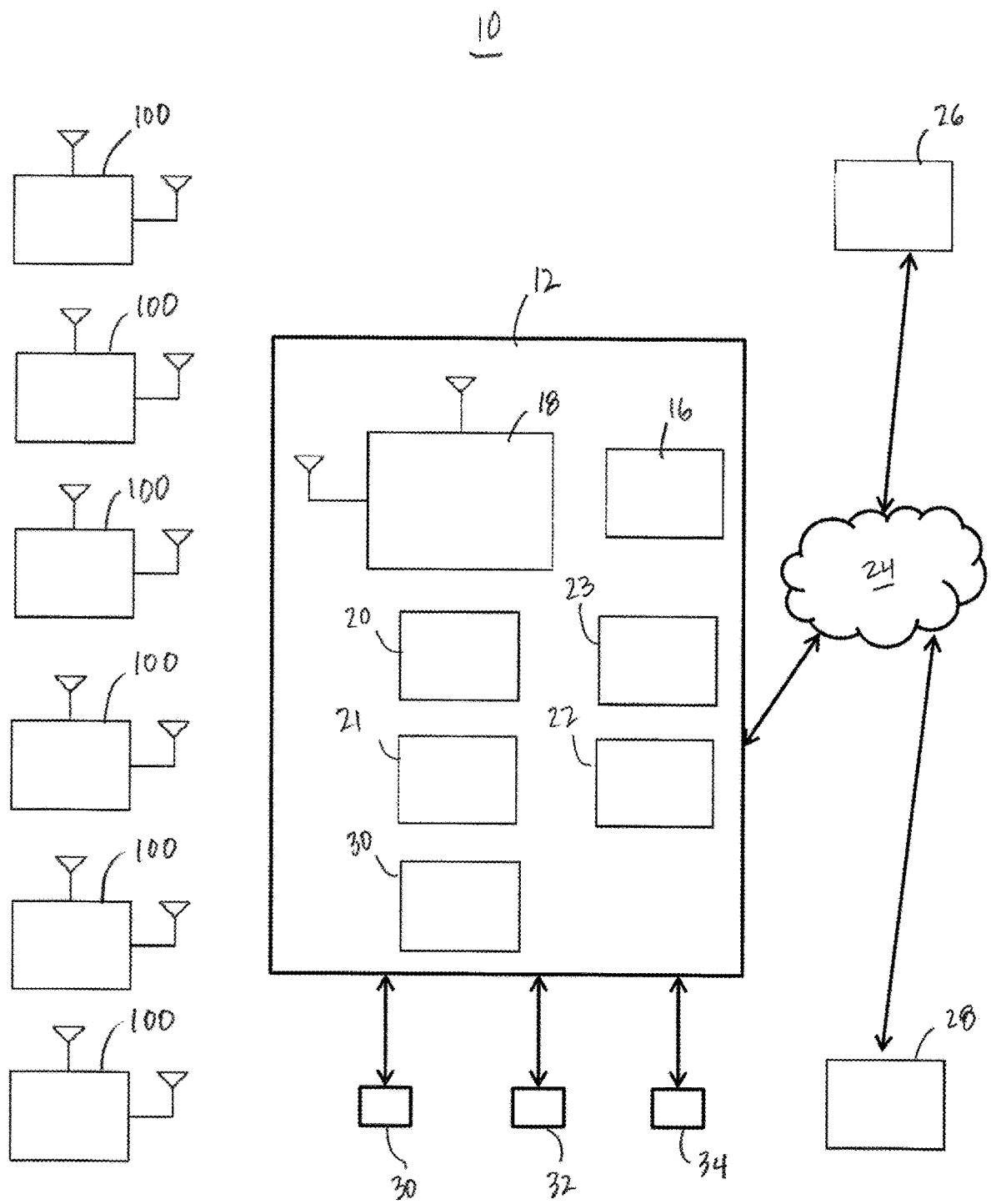
FIG. 1 is a schematic diagram illustrating a home security and environmental control system.

Referring to FIG. 1, a home monitoring system 10 is used to monitor the security of a home. Alternatively, or in addition, to monitoring home security, the home monitoring system 10 may also monitor the environment of the home. In some embodiments, the home monitoring system 10 also controls the security and/or environment of the home. The home monitoring system 10 includes a base 12 and self-identifying, multi-function sensor devices 100 that communicate with the base 12 via a wireless personal area network (WPAN). The home monitoring system 10 may also include various home security and environmental control elements. The various home security and environmental control elements monitored and controlled by the home monitoring system 10 may include, but are not limited to, an in-home alarm 30, entry locks 32 for doors, windows, and/or gates, and environmental controls 34 for home lighting, heating, air conditioning, and entertainment.

The base 12 includes a base power source 16, a controller 20 and a base communication device 18 such as a transceiver. The base 12 may also include memory 21 in communication with the controller 20 for storing information and/or instructions. The base 12 may also include user interface devices such as a key pad 22 and display 23 used, for example, to permit system configuration by a user and arming/disarming of the home monitoring system 10.

The base power source 16 provided in the base 12 may include a battery, electronics and a connection that permit connection to an alternating current (AC) power source, or both.

The communication device 18 permits communication, including transmission and reception of signals, between the base 12 and the sensor devices 100 and control elements 30, 32, 34 of the home monitoring system 10. In some embodiments, the communication device 18 is a transceiver. In some embodiments, the communication device 18 provides a set of wireless communication protocols and standards appropriate for the WPAN associated with the home monitoring system 10. For example, the communication device 18 may employ wireless technologies such as, but not limited to, Bluetooth®, Z-wave® or ZigBee® to transmit and receive information and instructions to and from the base 12.

The controller 20 monitors the sensor devices 100 via the transceiver 18, and based on information received from the sensor devices 100, provides information to the sensor devices 100 and the various home security and environmental control elements 30, 32, 34. Information provided by the controller 20 may include instructions and notifications.

The controller 20 may communicate with a remote client device 28, such as a personal computer, mobile telephone, smartphone, personal digital assistant, etc., via the internet 24 and/or a cellular network. For example, the controller 20 may receive instructions from a user via the remote client device 28 to alter the home environment, and then the controller 20 transmits corresponding instructions to the appropriate environmental controls 34.

The controller 20 may communicate with an external call center 26. For example, the controller 20 may receive information from a sensor device 100 indicating that moisture is detected in a basement of the home. Based on the received information, the controller 20 may send instructions to activate the alarm 30, may send instructions to the call center 26 indicating a potential trouble condition, and/or may send a notification to the user's remote client device 28.

Figure 2:
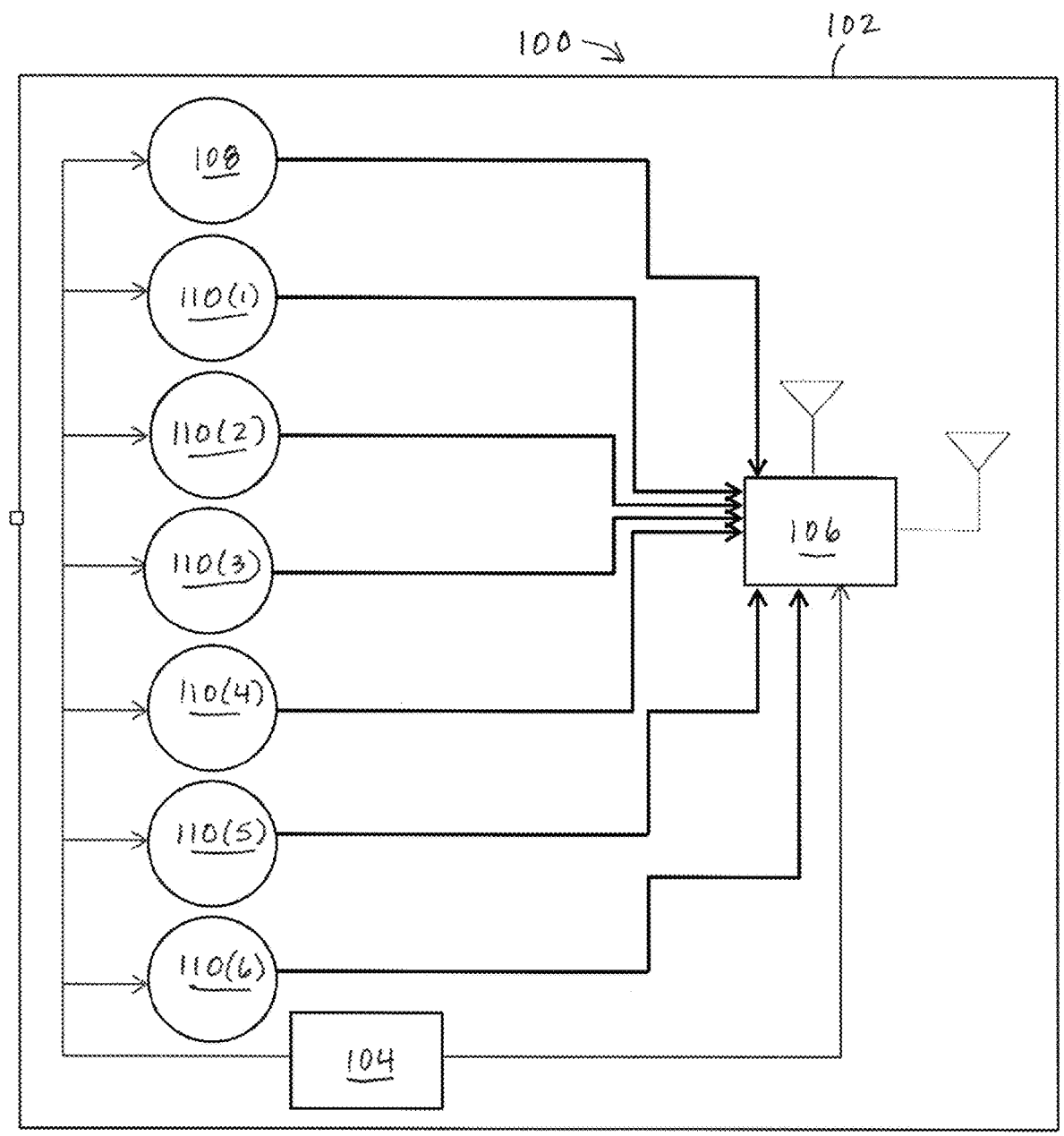
FIG. 2 is a schematic diagram illustrating the configuration of a sensor device.

Referring to FIG. 2, a self-identifying, multi-function sensor device 100 includes a sensors 108, 110, a sensor device power source 104 such as a battery and a sensor device communication device 106 disposed in and/or mounted on a sensor device housing 102.

The communication device 106 permits communication, including transmission and reception of signals, between the sensor device 100 and the base 12 of the home monitoring system 10. In some embodiments, the communication device 106 is a transceiver.

The sensor device 100 includes an attribute sensor 108 and functional sensors 110. The attribute sensor 108 is used by the sensor device 100 to determine the attribute of the sensor device 100. In the illustrated embodiments, the attribute of the sensor device 100 identifies the function (e.g., the sensor function) of the sensor device 100. The attribute of the sensor device 100, for example the sensor function of the sensor device 100, is determined based on the detected orientation of the sensor device housing 102. In use, the attribute sensor 108 detects an orientation of the sensor device housing 102, which is mapped to a specific function to be performed by the sensor device 100. In some embodiments, the attribute sensor 108 is a three-axis accelerometer.

In addition to the attribute sensor 108, the sensor device 100 includes functional sensors 110, one or more of which perform the function that corresponds to the detected attribute of the sensor device 100. In effect, the orientation of the sensor device housing 102 determines which of the functional sensors 110 is used to provide the desired sensor function.

Figures 3, 4:
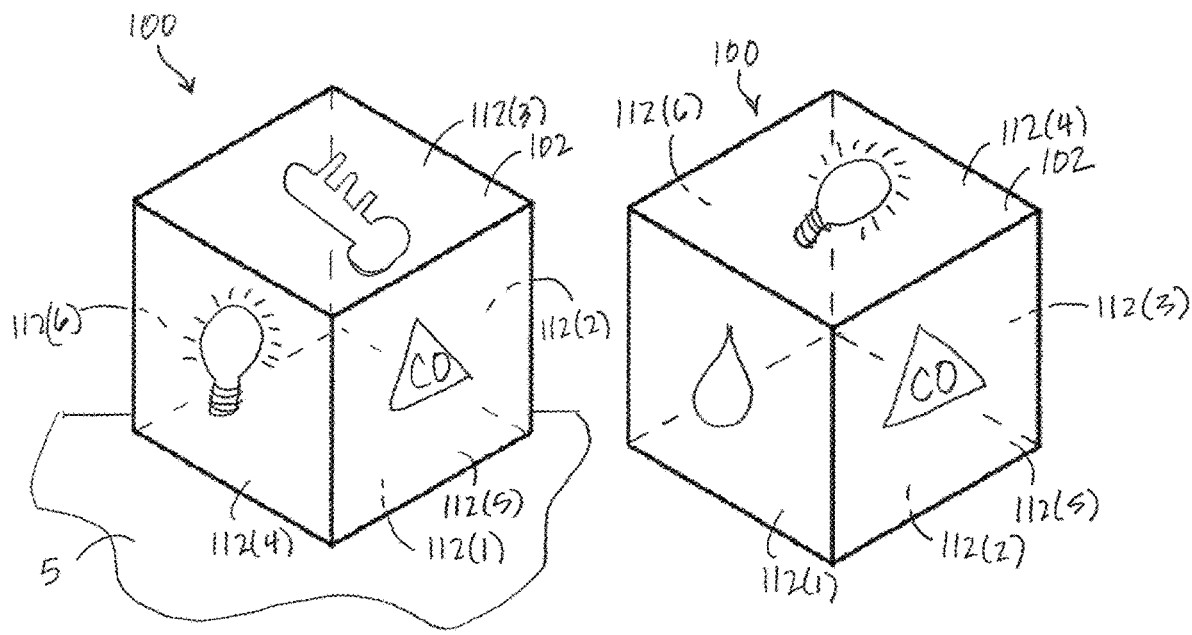
FIG. 3 is a perspective view of a sensor device having a cube shape and supported on a horizontal surface.
FIG. 4 is a perspective view of the sensor device of FIG. 3 in a different orientation.

Referring to FIGS. 3 and 4, the attribute sensor 108 and functional sensors 110 are housed within a polyhedronal sensor device housing 102. That is, the sensor device housing 102 includes several planar regions or sides 112 on which the sensor device housing 102 may be supported. The number and relative positions of the planar regions 112 of the sensor device housing 102 govern possible orientations of the sensor device housing 102 in space. For a sensor device housing 102 having a polyhedron shape with n sides, the sensor device 100 may have n possible orientations and thus n possible sensor functions, where one sensor function is associated with each side of the housing. In the illustrated embodiment, the sensor device housing 102 has the shape of a cube, and thus has six sides or planar regions 112 and six sensor functions. It is also possible that not each planar region 112 is associated with a functional sensor 110.

In some embodiments, a single, unique functional sensor 110 is associated with each orientation of the sensor device housing 102. For example, a first functional sensor 110(1), for example a temperature sensor, is associated with a first orientation of the sensor device housing 102. The first functional sensor 110 (1) is used when the attribute sensor 108 indicates that the sensor device housing 102 is supported on a first side 112 (1). A second functional sensor 110 (2), for example a visible light sensor, is associated with a second orientation of the sensor device housing 102. The second functional sensor 110 (2) is used when the attribute sensor 108 indicates that the sensor device housing 102 is supported on a second side 112 (2). A third functional sensor 110 (3), for example a water sensor, is associated with a third orientation of the sensor device housing 102. The third functional sensor 110 (3) is used when the attribute sensor 108 indicates that the sensor device housing 102 is supported on a third side 112 (3). A fourth functional sensor 110 (4), for example a gyroscope, is associated with a fourth orientation of the sensor device housing 102. The fourth functional sensor 110 (4) is used when the attribute sensor 108 indicates that the sensor device housing 102 is supported on a fourth side 112 (4). A fifth functional sensor 110 (5), for example a humidity, is associated with a fifth orientation of the sensor device housing 102. The fifth functional sensor 110 (5) is used when the attribute sensor 108 indicates that the sensor device housing 102 is supported on a fifth side 112 (5). In addition, a sixth functional sensor 110 (6), for example a gas detector, is associated with a sixth orientation of the sensor device housing 102. The sixth functional sensor 110 (6) is used when the attribute sensor 108 indicates that the sensor device housing 102 is supported on a sixth side 112 (6).

Each side 112 (1)-(6) the sensor device housing 102 is provided with indicia that indicates one of the six possible functions provided by the sensor device 100. In some embodiments, the indicia corresponding to a given sensor function is provided on a surface of the sensor device housing 102 opposed to the surface on which the sensor device 100 rests. This arrangement permits the user to easily visualize the function to be performed by the sensor device 100.

For example, in order to use the sensing device 102 to detect temperature, the user may place the sensor device 100 on a support surface 5 such that the sensor device housing 102 is supported on a first side 112 (1) (FIG. 3). In particular, the sensor device 100 is arranged so that the first side 112 (1) faces the support surface 5, and the opposed side of the sensor device housing, or the third side 112 (3), faces outward toward the user. For this reason, indicia corresponding to a temperature symbol (e.g., a thermometer) is provided on the housing third side 112 (3). When the attribute sensor 108 indicates that the sensor device housing 102 is supported on the first side 112 (1), the first functional sensor 110 (1), or temperature sensor, is used, and the sensor device 100 operates as a temperature sensor.

In order to change the sensor function of the sensor device 100, the orientation of the sensor device housing 102 is changed, for example, by rotating the sensor device housing 102 such that it is supported on another surface 112. For example, by rotating the sensor device 100 such that it is supported on the second side 112 (2), the attribute sensor 108 indicates that the sensor device housing 102 is supported on a second side 112 (2) and the sensor function of the sensor device 100 is changed to visible light detection (FIG. 4).

The cube shaped sensor device 100 illustrated in FIGS. 3 and 4 includes a temperature sensor 110 (1), a visible light sensor 110 (2), a water sensor 110 (3), a gyroscope 110 (4), a humidity sensor 110 (5), and a gas detector 110 (6), but is not limited to these particular sensors. Other sensors which may be employed in the sensor device 100 include, but are not limited to, a proximity sensor, a vibration sensor, a motion sensor, an optical sensor, a gyroscope, a magnetometer, a humidity sensor, a contact sensor, a microphone, a security camera, a gas detector such as a carbon monoxide sensor, a smoke detector, a rain detector, and a pressure detector such as a barometer. The sensors 108, 110 may be conventional electronic and/or mechanical sensors, microelectromechanical systems (MEMS), or a combination thereof.

In some embodiments, a combination of functional sensors 110 may be associated with one orientation of the sensor device housing 102. For example, in some embodiments, a gyroscope and an accelerometer are used to monitor the closed position of a door. In this example, the gyroscope is normally maintained in an inactive state to limit its current usage. The gyroscope is paired with the accelerometer to monitor the closed position of the door. In particular, the accelerometer is used to detect a vibration of the door, as would happen when a user accesses the door handle or applies a hand to the door to push it. Upon detection of a vibration of the door by the accelerometer, the gyroscope is actuated to monitor whether the door is rotated to an open position. In this case, acceleration detection may be performed by the attribute sensor (accelerometer) 108 as a secondary function thereof, rather than including two accelerometers within the sensor device housing 102. In alternative embodiments, a motion detector or a proximity sensor may replace the accelerometer as the device used to trigger the gyroscope.

It is contemplated that the functional sensors 110 are configurable for use individually and/or in combination to provide a variety of possible sensor device operating modes.

In some embodiments, during an initial set up of the home monitoring system 10, the controller 20 of the base 12 sends out a signal to the sensor device 100. The sensor device transceiver 106 returns a signal to the controller 20 corresponding to the orientation of the sensor device housing 102 as detected by the attribute sensor 108. The signal sent to the controller 20 may also include identifying information, e.g., a unique serial number, so that the controller knows with which sensor device 100 of the home monitoring system 10 it is communicating. Thereafter, the home monitoring system 10 monitors, controls, and communicates with the sensor device 100 according to the sensor function that corresponds to the indicated housing orientation.

In some embodiments, once communication between the sensor device 100 and the base 12 has been established, the home monitoring system 10 may require a calibration of the sensor device 100. For example, to establish a proper monitoring range for a sensor device 100 configured (e.g., oriented) to perform position sensing in order to monitor door opening, the controller 20 may require output from the gyroscope 110 (4) while the door is in a closed position to establish a baseline signal, particularly since there may be some small normal environmental motion of the door in the closed state that would not require user notification. In addition, the controller 20 may require output from the gyroscope 110 (4) while the door is positioned in an open position to establish a characteristic signal of the gyroscope 110 (4) for the open door condition. Initialization, and calibration where needed, may be provided for each sensor device 100 of the home monitoring system 10.

Following these preliminary steps (e.g., during use), the base 12 periodically monitors the appropriate sensors 108, 110 of each sensor device 100 to identify any circumstances that require user notification or alarm, such as detection of an appropriate signal from the sensors 108, 110. The monitoring duty cycle of each sensor device 100 may vary depending on the sensor function being performed by that device 100.

Figure 5:
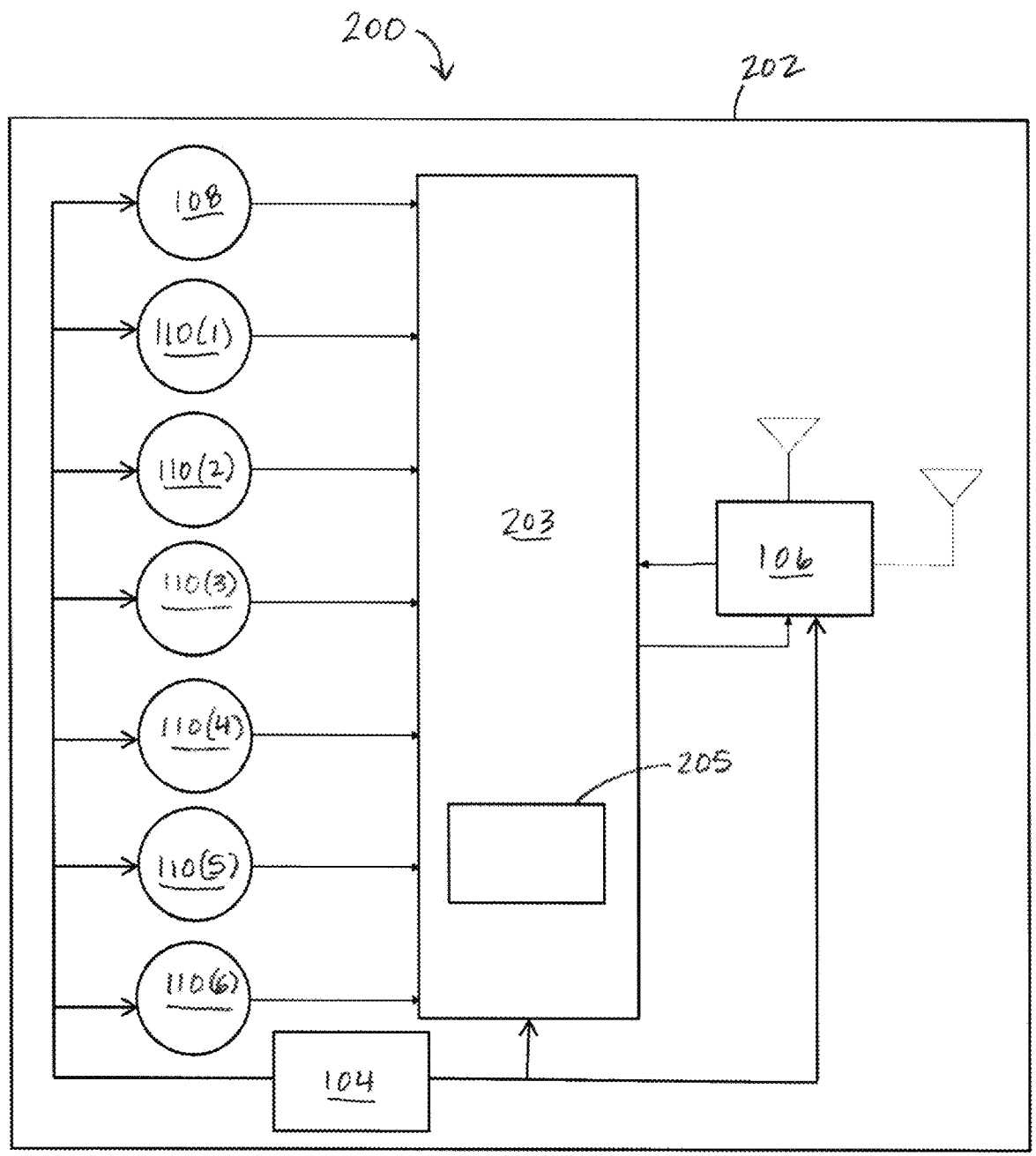
FIG. 5 is a schematic diagram illustrating the configuration of an alternative sensor device.
Figure 6:
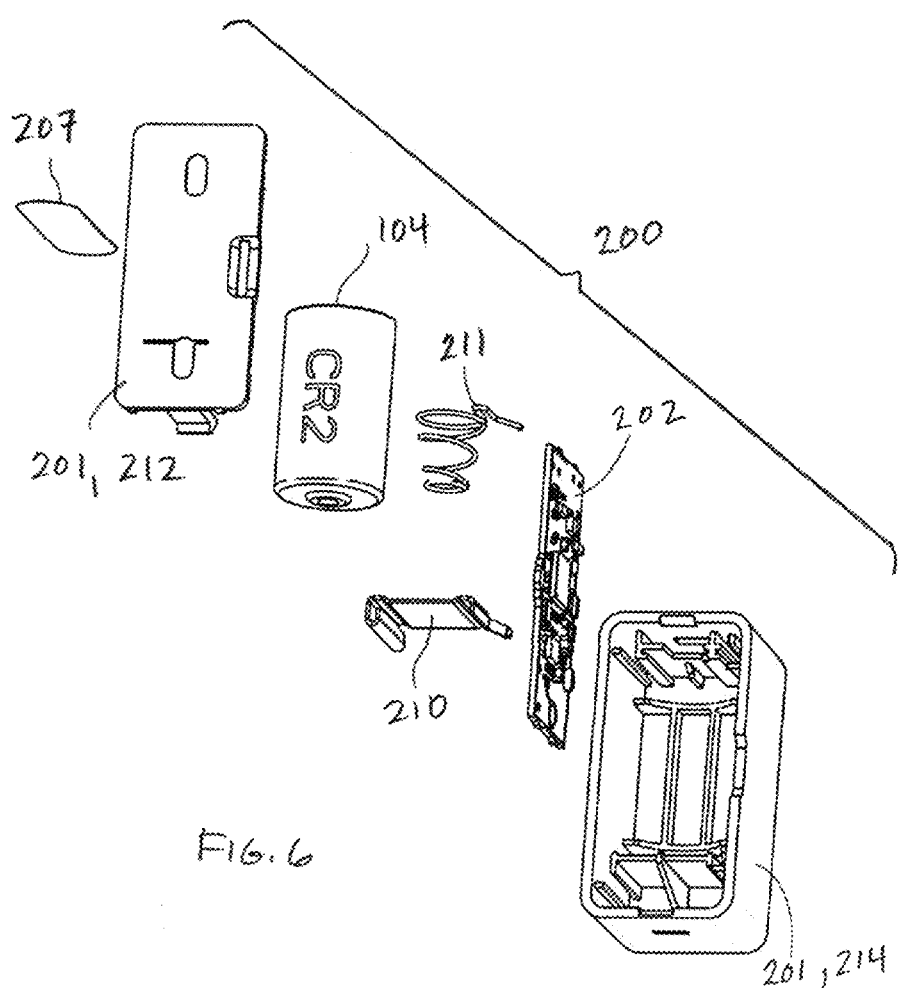
FIG. 6 is an exploded view of the sensor device of FIG. 5.
Figure 7:
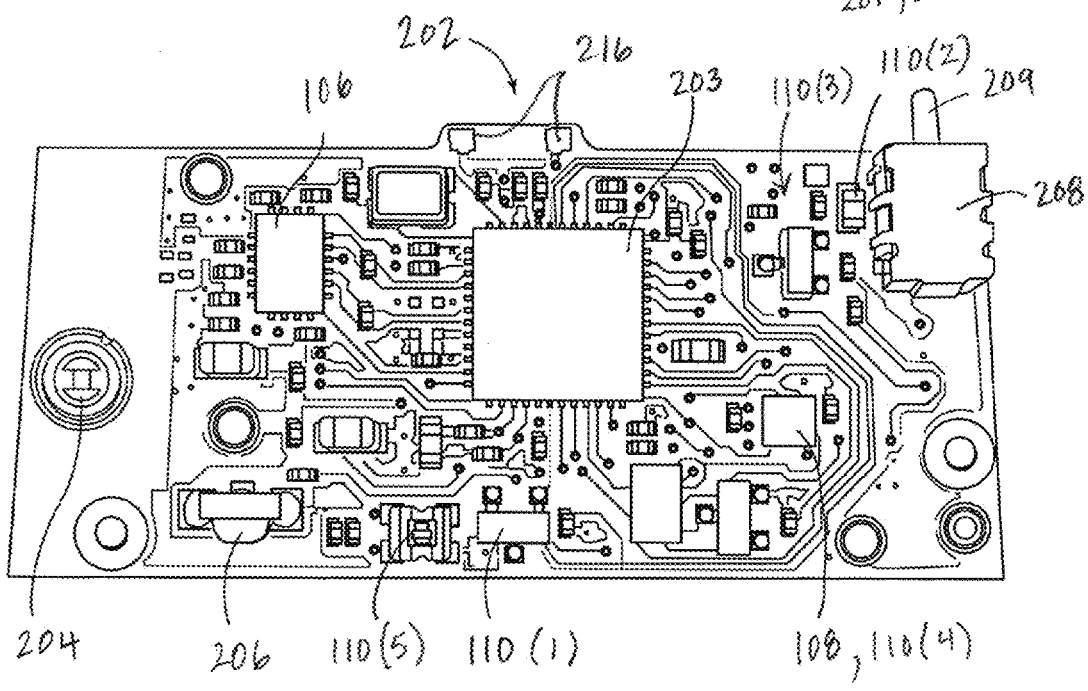
FIG. 7 is a perspective view of a printed circuit board of the sensor device of FIG. 5.

Referring to FIGS. 5-7, an alternative embodiment self-identifying, multi-function sensor device 200 includes the sensors 108, 110, the sensor device power source 104 such as a battery and the sensor device communication device 106 disposed in and/or mounted on a sensor device housing 201. The sensor device housing 201 may include a mounting plate 212 that may be fixed to a support surface, and a cover 214 that may be secured to the mounting plate 206 in more than one orientation. In addition, the sensor device 200 includes a microcontroller 203 having internal memory 205. The sensor device communication device 106 the microcontroller 203 and the memory 205 may be mounted on and electrically connected via, a printed circuit board 202, along with the sensors 108, 110, an antenna 204, a signaling LED 206, a tamper switch 208, and other ancillary devices and structures. The printed circuit board 202 is disposed within the cover 214 of the sensor device housing 201. The battery 104 is electrically connected to the printed circuit board 202 via positive and negative leads 210, 211 that are mounted within the cover 214.

The rectangular shaped sensor device 200 illustrated in FIGS. 6 and 7 includes a Hall effect sensor 110 (1), a temperature sensor 110 (2), a water sensor 110 (3) including water sensor probes 216, a gyroscope 110 (4), a humidity sensor 110 (5), and a gas detector 110 (6), but is not limited to these particular sensors.

The communication device 106 permits communication, including transmission and reception of signals via the antenna 204, between the sensor device 100 and the base 12 of the home monitoring system 10. In some embodiments, the communication device 106 is a transceiver. In some embodiments, the communication device 106 provides a set of wireless communication protocols and standards appropriate for the WPAN associated with the home monitoring system 10. For example, the communication device 106 may employ wireless technologies such as, but not limited to, Bluetooth®, Z-wave® or ZigBee® to transmit and receive information and instructions to and from the base 12.

In some embodiments, during an initial set up of the home monitoring system 10 including the sensor device 200, the sensor device microcontroller 203 receives a signal corresponding to the sensor device housing orientation from the attribute sensor 108, and determines the device sensor function based on the orientation of the housing 202. The sensor device 200 then initiates a connection with the controller 20 of the base 12 by sending out a signal to the controller 20 that includes information corresponding to sensor function of the sensor device 200 as detected by the attribute sensor 108. The signal sent to the controller 20 may also include an identifying information so that the controller knows with which sensor device 200 of the home monitoring system 10 it is communicating.

In other embodiments, during an initial set up of the home monitoring system 10 including the sensor device 200, the mounting plate 212 is secured to the application surface (i.e., a door frame). In some embodiments, an orientation of the mounting plate 212 determines an orientation of the cover 214. In other embodiments, the mounting plate 212 is configured to receive the cover 214 in one of several possible orientations. The sensor device power source 104 is then powered, for example via a switch (not shown) or simply by removing a battery pull tab insulator 207 disposed between the battery 104 and a corresponding lead 210. The cover 214 is then attached to the mounting plate 212 in an orientation that corresponds to the desired sensor function. In the illustrated embodiment, the cover 214 is snap fitted onto the mounting plate 212. The cover 214 is then manually tapped (e.g., using a fingertip) a predetermined number of times within a predetermined time period following powering of the device 200. For example, the cover 214 may be tapped three times within 20 seconds of powering the sensor device 200. The tapping of the cover 214 is detected by the attribute sensor 108, which is an indication to the device to identify the device orientation, and thus the device function, based on the identified orientation. Optionally, the device 200 may then flash the LED 206 a specified number of times to indicate the programmed function of the device 200. For example, the LED 206 may flash once to indicate use of the hall effect sensor 110 (1), or three times to indicate use of the water detector 110 (3), etc.

The sensor device 200 may be pre-programmed to use one of the sensors (e.g., a default sensor), and if no manual taps are performed within the predetermined time period, the sensor device 200 operates using the default sensor. For example, the sensor device 200 may be pre-programmed to use the most commonly used sensor, such as the Hall effect sensor 110 (1) which can be used, for example, to identify door or window opening or closure. Advantageously, since most applications use the Hall effect sensor 110 (1), the initial set up of the sensor device 200 may be omitted in these applications.

In still other embodiments, during an initial set up of the home monitoring system 10 including the sensor device 200, the sensor device 200 is held in the user's hand in an orientation corresponding to the desired sensor function. While holding the sensor device 200, the user presses the plunger 209 of the tamper switch 208, and then manually taps the cover 214 a predetermined number of times within a predetermined time period following depression of the plunger 209. The tapping of the cover 214 is detected by the attribute sensor 108, which is an indication to the device to identify the device orientation, and thus the device function, based on the identified orientation. Although this method adds an additional step, it a) permits the battery to be replaced without requiring re-programming since the sensor function is held in non-volatile memory, and b) permits addition of an additional sensor function. For example, a six-sided device could provide seven sensor functions.

In operation, the sensor device microcontroller 203 monitors the output of the corresponding functional sensors 110, and, when appropriate, the transceiver 106 sends a signal to the base controller 20 corresponding to a sensor triggering event. The signal sent to the controller 20 may also include the identifying information. Thereafter, the home monitoring system 10 provides corresponding notifications and/or alarms corresponding to the sensor function of the sensor device 200.

Alternatively, based on the orientation of the sensor device housing 202 as transmitted by the transceiver 106, the base controller 20 may download a standard set of parameters and instructions to the sensor device microcontroller 203 that permit the sensor device 200 to operate according to the sensor function. As before, the sensor device microcontroller would transmit an alarm or notification triggering signal to the base 12 upon detection of an appropriate signal from the sensors 108, 110.

Figure 8:
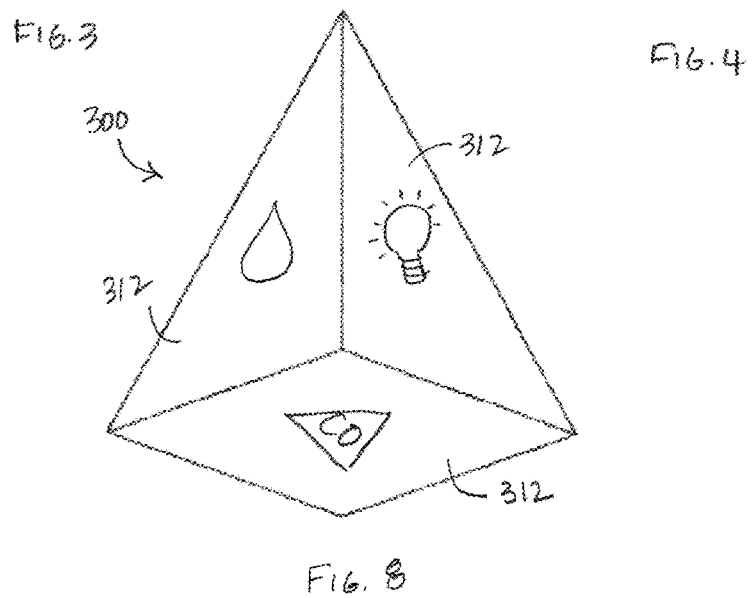
FIG. 8 is a perspective view of a sensor device having a pyramid shape.

Referring to FIG. 8, although the sensor device housing 102 is illustrated as having a cube shape, the sensor device housing 102 is not limited to a polyhedron having six sides. The sensor device housing may be a polyhedronal shape having fewer or greater number of sides, depending on the requirements of the application or the constraints associated with packing several sensors within a single housing. For example, an alternative sensor device 300 has a pyramidal shape whereby it includes five sides 312 and can provide up to five different sensor functions.

Figure 9:
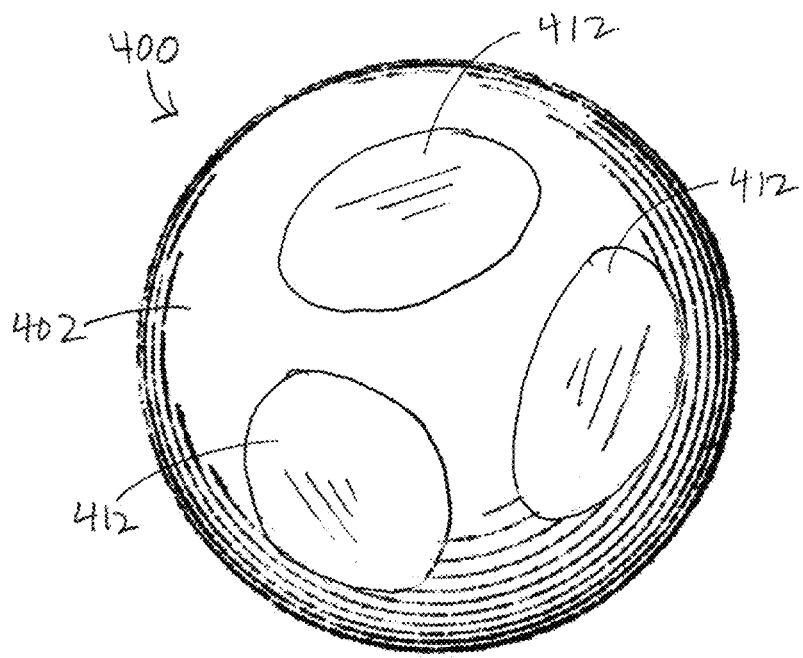
FIG. 9 is a perspective view of a sensor device having a generally spherical shape and including planar surfaces.

Referring to FIG. 9, another alternative sensor device 400 is generally spherical in shape, and includes planar regions 412 formed in the outer surface of the sensor device housing 402. The planar regions 412 permit the sensor device 400 to establish multiple discrete orientations when supported, each of which is mapped to a corresponding sensor function.

Figure 10:
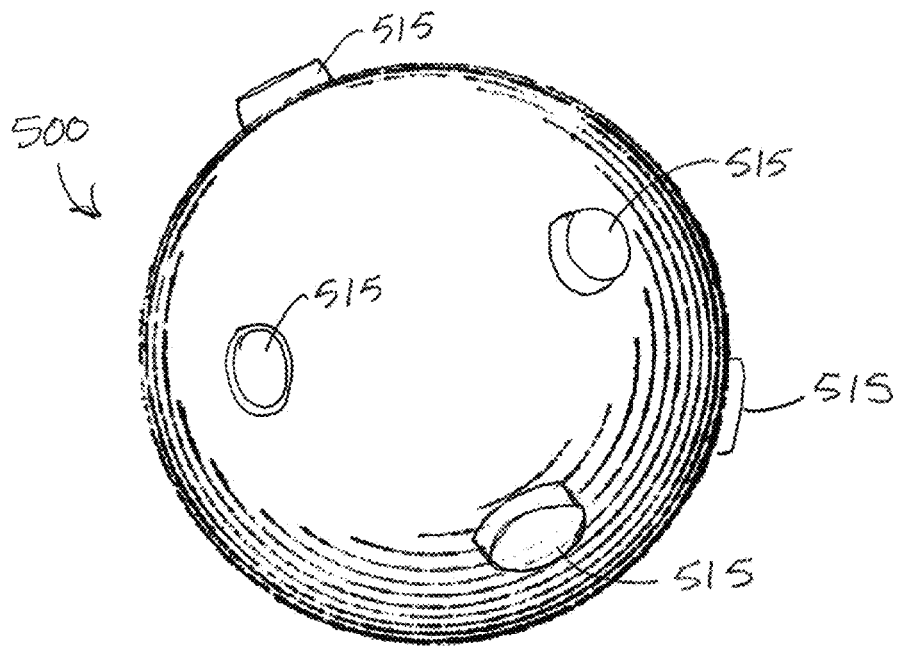
FIG. 10 is a perspective view of a sensor device having a spherical shape and including connectors for establishing a desired sensor device orientation.

Referring to FIG. 10, although the sensor device housing 102 has been described as having at least one planar region or planar surface 112, the sensor device housing 102 is not limited to this configuration. In some embodiments, the sensor device housing may be free of planar regions 112. For example, yet another alternative embodiment sensor device 500 includes a sensor device housing 502 having a spherical shape, and includes surface features such as connectors 515 that secure the sensor device housing 502 to a support surface in a desired orientation. The connectors 515 permit the sensor device 500 to establish multiple discrete orientations, each of which is mapped to a corresponding sensor function.

Figure 11:
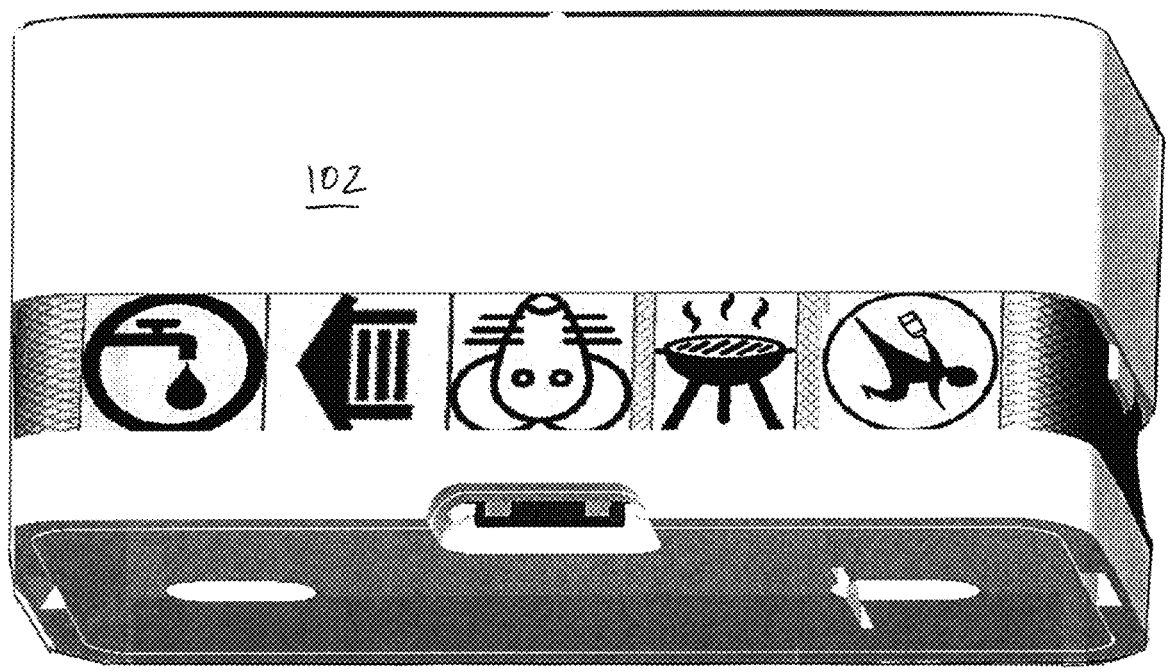
FIG. 11 is a perspective view of another alternative sensor device.

In the embodiments illustrated in FIGS. 3, 4 and 8, the sensor device includes indicia corresponding to a given sensor function. The indicia is provided on a surface of the sensor device housing 102 that is opposed to the surface on which the sensor device 100 rests. However the sensor device is not limited to this configuration. For example, as seen in FIG. 11, all the indicia may be provided on the same side of the device housing 102. In the embodiment shown in FIG. 11, the function of the sensor device 700 is selected by arranging the device housing 102 such that the corresponding icon is in an upright orientation.

Although the sensor devices 110 are illustrated as being supported on a horizontal support surface, for example by resting thereon, the sensor devices 110 are not limited to being used on a horizontal support surface. For example, a planar region 112 of the sensor device housing 102 may be secured to a non-horizontal support surface by conventional means, including using fasteners such as screws, adhesive and/or hook-and-loop fastener.

Although the attribute sensor 108, which detects the orientation of the sensor device housing 102, is described herein as a single accelerometer, the attribute sensor 108 is not limited to this configuration, and other types of sensors may be used to detect the orientation of the sensor device housing 102. For example, the attribute sensor 108 may be a gyroscope. In another example, a proximity sensor may be provided for each planar region 112 to indicate the planar region upon which the sensor device 100 is supported.

In the illustrated embodiments, the attribute of the sensor device 100 identifies the function of the sensor device 100. It may also be advantageous to set a location of the sensor device 100 for use by the home monitoring system 10. For example, the home monitoring system 10 may use location information to determine with better specificity actions and alerts provided by the system 10. In some embodiments, a sequence or number of finger taps are used to identify a location of the sensor device 100. For example, predetermined finger tap sequences may be mapped to locations (e.g., kitchen, basement, bedroom, etc.). The device cover may be manually tapped (e.g., using a fingertip) a predetermined number of times within a predetermined time period following power-up, and the tapping of the cover is detected by the attribute sensor 108. The number of taps detected by the attribute sensor 108 is used to set the location used by system 100.

As previously discussed, in the illustrated embodiments, the attribute of the sensor device 100 identifies the function of the sensor device 100. However, the attribute of the sensor device 100 is not limited to identifying the function of the sensor device 100. In other embodiments, the attribute of the sensor device 100 identifies the location of the sensor device 100. For example, the attribute sensor 108 detects an orientation of the sensor device housing 102 which mapped to a specific location. A first location within the house 2, for example a kitchen, is associated with a first orientation of the sensor device housing 102. The first sensor 110 (1), which may be a smoke detector, is used when the attribute sensor 108 indicates that the sensor device housing 102 is supported on a first side or planar region 112 (1). Similarly, a second location within the house 2, for example a foyer is associated with a second orientation of the sensor device housing 102. The second sensor 110 (2), which may be a motion sensor, is used when the attribute sensor 108 indicates that the sensor device housing 102 is supported on a second side or planar region 112 (2).

In some embodiments, the location-attributed sensor device 100 may include a switch to permit selection of the sensor function to be monitored by the home monitoring system. In other embodiments, the base controller 20 provides instructions to the sensor device 100 including which sensor function is to be used by the sensor device 100 based on the identified location. In still other embodiments, a sequence of finger taps are used to select the sensor function to be used by the location-attributed sensor device 100. For example, the device cover may be manually tapped (e.g., using a fingertip) a predetermined number of times within a predetermined time period following power-up, and the tapping of the cover is detected by the attribute sensor 108. The number of taps detected by the attribute sensor 108 is used to set the sensor function used by the location-attributed sensor device 100.

Figure 12:
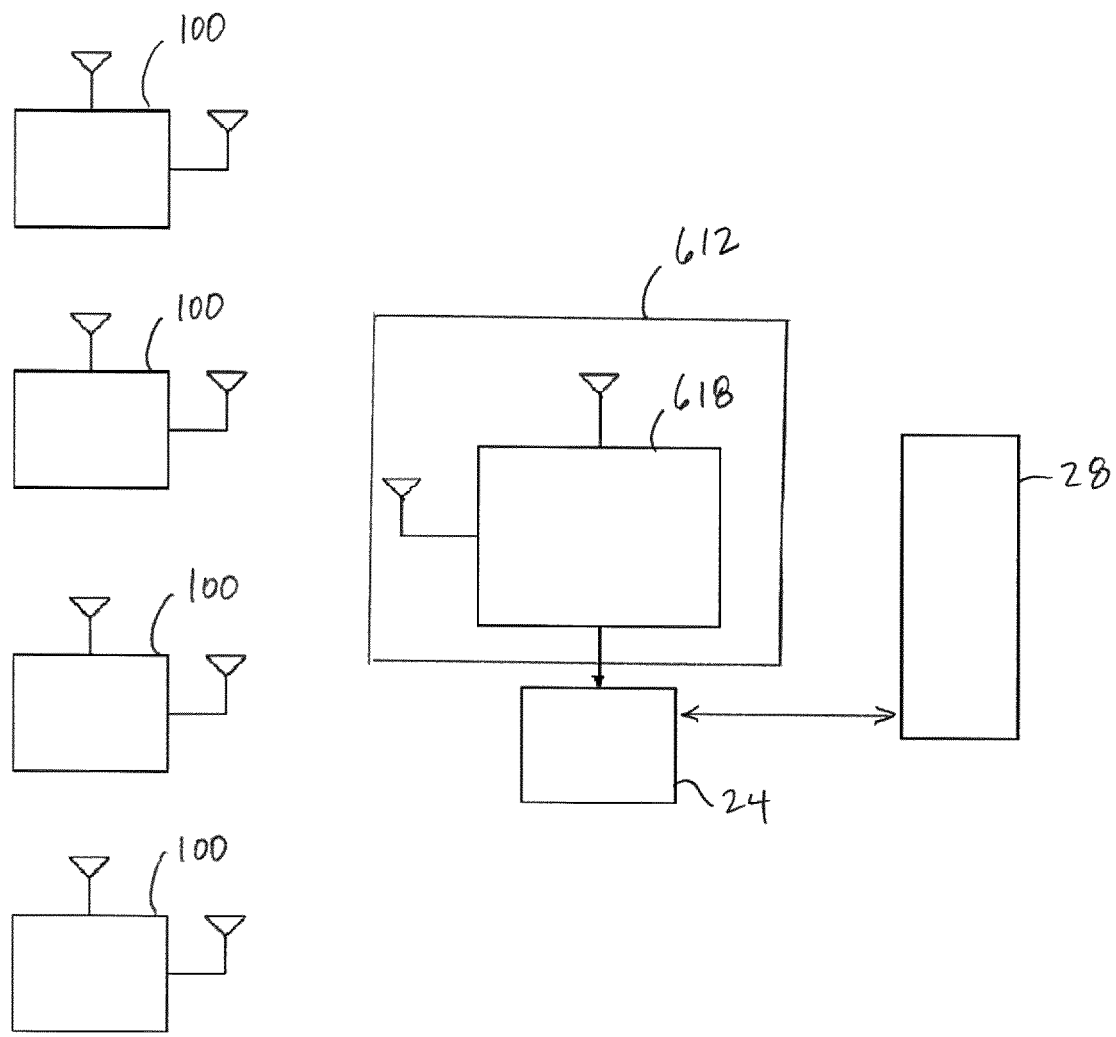
FIG. 12 is a schematic diagram illustrating an alternative home security and environmental control system.

Referring to FIG. 12, although the home monitoring system 10 is described herein as including the base 12 having the base power source 16, the controller 20, the base communication device 18, memory 21, and the user interface devices 22, 23, the base 12 is not limited to this configuration. For example, in some embodiments, an alternative base 612 is used that is simplified relative to the base 12. The alternative base 612 has a transceiver 618 that permits communication between each sensor device 100 and a remote client device 28 such as a smartphone. The remote client device 28 includes an application permitting the user to monitor the sensor device 100.

Although the home monitoring system 10 is described as a wireless system, the home monitoring system 10 is not limited to being wireless. For example, in some embodiments, the base 12 and/or sensor devices 100 may be hard wired. Moreover, the number and types of sensors 108, 110 and their applications is not limited to those described herein.

Besides being equipped with the multifunction sensor devices 100, the home monitoring system 10 may also include single-function sensor devices.

Although the home monitoring system 10 and sensor devices 100 are described herein as having application to residential security and environmental control, the home monitoring system 10 and sensor devices 110 are also suitable for use in commercial settings.

Selective illustrative embodiments of the system and device are described above in some detail. It should be understood that only structures considered necessary for clarifying the system and device have been described herein. Other conventional structures, and those of ancillary and auxiliary components of the system and device, are assumed to be known and understood by those skilled in the art. Moreover, while a working example of the system and device have been described above, the system and device are not limited to the working examples described above, but various design alterations may be carried out without departing from the system and device as set forth in the claims.

What is claimed is:

1. A sensor device comprising
a housing,
an attribute sensor associated with the housing, the attribute sensor configured to detect an orientation of the housing,
functional sensors associated with the housing, the functional sensors configured to provide multiple possible sensor device operating modes, each of the possible sensor device operating modes corresponding to at least one function of one of the functional sensors, and
a communication device associated with the housing, the communication device configured to communicate output from at least one of the attribute sensor and the functional sensors to a remote controller,
wherein
the sensor device is configured to be operated in an active operating mode corresponding to one operating mode selected from the multiple possible sensor device operating modes, and the active operating mode is determined by the orientation of the housing.

2. The sensor device of claim 1, wherein the housing is multi-sided and a unique functional sensor is associated with each side of the housing.

3. The sensor device of claim 1, wherein the functional sensors are configurable for use individually and in combination to provide the multiple possible sensor device operating modes.

4. The sensor device of claim 1, wherein a first sensor function is associated with a first orientation of the housing, and a second sensor function is associated with a second orientation of the housing, where the second orientation is different than the first orientation.

5. The sensor device of claim 4, wherein a combination of functional sensors is associated with the first orientation of the housing.

6. The sensor device of claim 1, wherein the housing has an outer surface that includes a first region and a second region that is spaced apart from the first region, and the first region and the second region are configured to permit the housing to be supported in a predetermined orientation.

7. The sensor device of claim 6, wherein the housing is a polyhedron and the first region corresponds to a first side of the polyhedron, and the second region corresponds to a second side of the polyhedron.

8. The sensor device of claim 1, wherein the attribute sensor is an accelerometer.

9. The sensor device of claim 1, wherein the attribute sensor is configured to detect an orientation of the housing with respect to one of space and a support surface.

10. The sensor device of claim 1, wherein the functional sensors are selected from the group comprising a proximity sensor, a visible light sensor, a temperature sensor, a pressure sensor, a motion sensor, and a contact sensor.

11. The sensor device of claim 1, wherein the sensor device includes a microcontroller that is configured to determine at least one of an orientation of the housing and a sensor function of the sensor device.

12. The sensor device of claim 1, wherein at least one of an orientation of the housing and a sensor function of the sensor device is determined by a remote system controller based on a signal emitted by the sensor device.

13. A security system comprising
a base unit including a controller and a transceiver, and
a sensor device, the sensor device having
a housing,
multiple sensors associated with the housing, and
a communication device associated with the housing that permits communication with the base unit,
wherein
the sensor device is operable in multiple operating modes, each of the operating modes corresponding to at least one function of one of the sensors, and an active operating mode of the sensor device, corresponding to one operating mode selected from the multiple operating modes, is determined by the orientation in space of the sensor device housing, and
the base unit is configured to receive from the sensor device information corresponding to the active operating mode.

14. The security system of claim 13, wherein information corresponding to the active operating mode includes at least one of sensor device orientation, sensor device function, and sensor output.

15. The security system of claim 13, wherein the base unit is configured to configure the security system to operate based on the active operating mode of the sensor device.

16. The security system of claim 13, wherein the sensor device includes a unique identification number, and is configured to communicate the active operating mode and the unique identification number to the base unit.

17. The security system of claim 13, wherein the controller is configured to receive an output signal from the sensor device and perform a notification function corresponding to the output signal.

18. The security system of claim 13, wherein the sensor device comprises a first sensor device having a first plurality of sensors, and a second sensor device having a second plurality of sensors that are different from the first plurality of sensors.

19. A security system comprising
a base unit including a controller and a first communication device,
a sensor device, the sensor device including
a housing,
multiple sensors associated with the housing including
a first sensor that is configured to determine an orientation of the housing, and
a second communication device associated with the housing that permits communication with the first communication device,
wherein
a location of the sensor device within a region being secured by the security system is determined by the orientation in space of the sensor device housing as determined by the first sensor,
the sensor device is configured to be operated in a predetermined operating mode based on the location of the sensor device within a region being secured by the security system, and
the base unit is configured to receive from the sensor device information identifying the location of the sensor device within a region being secured by the security system, and to configure the security system to operate in the predetermined operating mode.

20. The security system of claim 19, wherein the base unit is configured to receive from the sensor device information identifying the location of the sensor device within a region being secured by the security system, and to configure the security system to operate in the predetermined operating mode based on the information and on a number of finger taps detected by the sensor device.

* * * * *